United States Patent [19]

Rach et al.

[11] Patent Number: 4,610,287

[45] Date of Patent: Sep. 9, 1986

[54] METHOD AND APPARATUS FOR DEMOUNTING PNEUMATIC VEHICLE TIRES

[75] Inventors: Heinz-Dieter Rach, Garbsen; Udo Frerichs, Langenhagen; Hans-Ulrich Klose, Wiedensahl; Carsten Boltze, Barsinghausen, all of Fed. Rep. of Germany

[73] Assignee: Continental Gummi-Werke Aktiengesellschaft, Hanover, Fed. Rep. of Germany

[21] Appl. No.: 758,168

[22] Filed: Jul. 23, 1985

[30] Foreign Application Priority Data

Jul. 28, 1984 [DE] Fed. Rep. of Germany ....... 3428010

[51] Int. Cl.⁴ ............................................. B60C 25/06
[52] U.S. Cl. .................................................. 157/1.17
[58] Field of Search ................. 157/1.1, 1.17; 254/131

[56] References Cited

U.S. PATENT DOCUMENTS 3,198,362 8/1965 Berg ................................ 254/131 X
4,462,451 7/1984 Ogren .................................. 157/1.17

*Primary Examiner*—James G. Smith
*Attorney, Agent, or Firm*—Becker & Becker, Inc.

[57] ABSTRACT

A method and apparatus for demounting a pneumatic vehicle tire, the beads of which, in the mounted state, are disposed on the radially inner periphery of a wheel rim having a deep mounting bed and, laterally outwardly therefrom, rim flanges which extend essentially radially inwardly. First, a portion of a given tire bead is forced into the deep mounting bed, and subsequently the oppositely located portion of the same tire bead is lifted over the rim flange.

10 Claims, 3 Drawing Figures

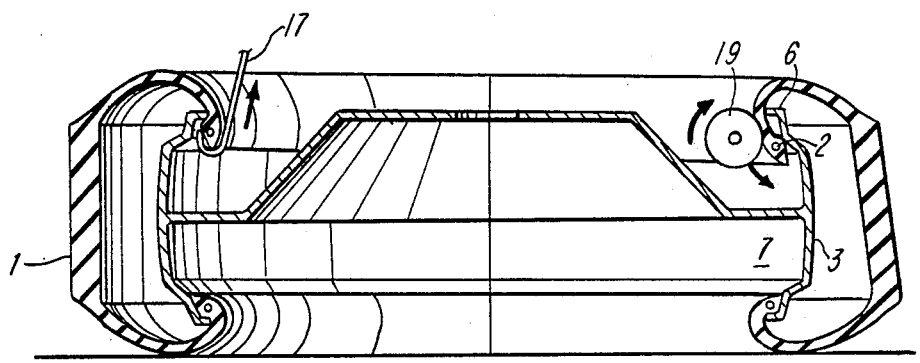

METHOD AND APPARATUS FOR DEMOUNTING PNEUMATIC VEHICLE TIRES

BACKGROUND OF THE INVENTION

The present invention relates to a method of demounting a pneumatic vehicle tire, the beads of which, in the mounted state, are disposed on the radially inner periphery of a wheel rim having a deep mounting bed and, laterally outwardly therefrom, rim flanges which extend essentially radially inwardly. The present invention also relates to an apparatus for carrying out this method.

A vehicle wheel and tire assembly where the beads of the tire are secured on the radially inner portion of the rim, are described, for example, in German Offenlegungsschrift No. 30 00 428, and in U.S. Pat. No. 4,408,647, which belongs to the Assignee of the present application. Heretofore known tire demounting apparatus cannot be utilized with such pneumatic vehicle tire and wheel assemblies because the relationships of a tire which is secured on the radially outer side of the rim differ in principle to those of a tire secured on the radially inner side of the rim.

It is therefore an object of the present invention to provide a method, and an apparatus for carrying out such a method, where pneumatic vehicle tires can be demounted from vehicle wheels of the aforementioned type in such a way that the tire is treated as carefully as possible.

BRIEF DESCRIPTION OF THE DRAWINGS

This object, and other objects and advantages of the present invention, will appear more clearly from the following specification in conjunction with the accompanying drawings, in which:

FIG. 3 is a diagrammatic view of a second inventive embodiment of a demounting apparatus having a driveable roller and a demounting hook.

SUMMARY OF THE INVENTION

Figure 1:
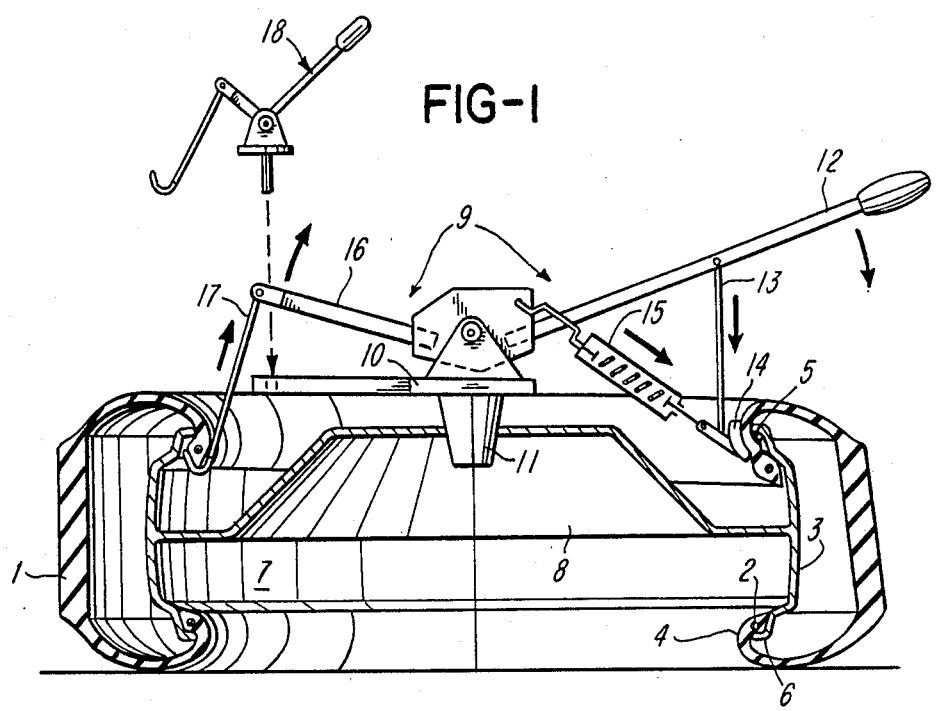
FIG. 1 is a side view of a first inventive demounting apparatus having a knee lever.

The method of the present invention is characterized primarily in that first a portion of one tire bead is forced into the deep mounting bed, and subsequently the oppositely located portion of the same tire bead is lifted over the rim flange.

An apparatus for carrying out this method is characterized primarily by a means for forcing one of the tire beads into the deep mounting bed, and by a further means for lifting the oppositely located portion of that tire bead over the rim flange.

The underlying realization of the present invention is that in order to have a demounting process which treats the tire carefully, it is not exceptable with a vehicle wheel and tire assembly of the aforementioned general type to merely allow a demounting hook to engage the tire bead and to then lift the bead over the rim flange with a great force. Rather, the critical thing pursuant to the present invention is to first force an oppositely located bead portion at least partially into the deep mounting bed. With these measures, the pull resistant and compression resistant core ring is moved out of the concentric position relative to the circle formed by the rim flange, so that the tire bead on that side located opposite the portion which extends into the deep bed can be lifted over the radially inwardly extending rim flange in a very simple manner.

The introduction of one portion of a bead, in the bridging of the rim flange by the oppositely located portion of that bead, can be effected with the aid of two separate movement sequences, or by a single movement sequence.

If two separate movement sequences are to be undertaken, the introduction of one portion of a given bead can be effected in an advantageous manner with means which already exist on a mounting apparatus; for example, this means can be a driveable roller or a displaceable mounting spoon.

For another situation, in which pursuant to a preferred embodiment of the present invention a manually operable knee lever is used, during a single movement sequence a tire bead portion is forced into the deep mounting bed during a first portion of the movement, whereas during a second portion of the movement the oppositely located bead portion is lifted over the rim flange. An apparatus having a knee lever was selected because with such a knee lever both movements can be carried out with the aid of a single pressing movement. Furthermore, from the standpoint of the force which has to be exerted, and the ease of operation, an apparatus which is pushed is easier for a person to use than an apparatus which has to be pulled.

Further advantageous embodiments of the present invention will be described subsequently.

DESCRIPTION OF PREFERRED EMBODIMENTS

Referring now to the drawings in detail, a vehicle wheel and tire assembly, in connection with which the inventive demounting apparatus is to be used, comprises the tire 1 which is to be demounted, with the beads 2 of the tire being secured to the radially inner periphery of a rigid, one-piece rim 3. The beads 2, which are provided with pull resistant and compression resistant core rings 4, are disposed on concentric or slightly inclined rim seating surfaces 5, which in turn are disposed next to rim flanges 6 which essentially extend radially inwardly. A deep mounting bed or recessed mounting portion 7 adjoins the seating surfaces 5 axially inwardly thereof. The wheel disk 8 of the rim 3 is located in the region of the deep mounting bed 7, which has a diameter which is considerably greater than the diameter of the seating surfaces 5.

Figure 2:
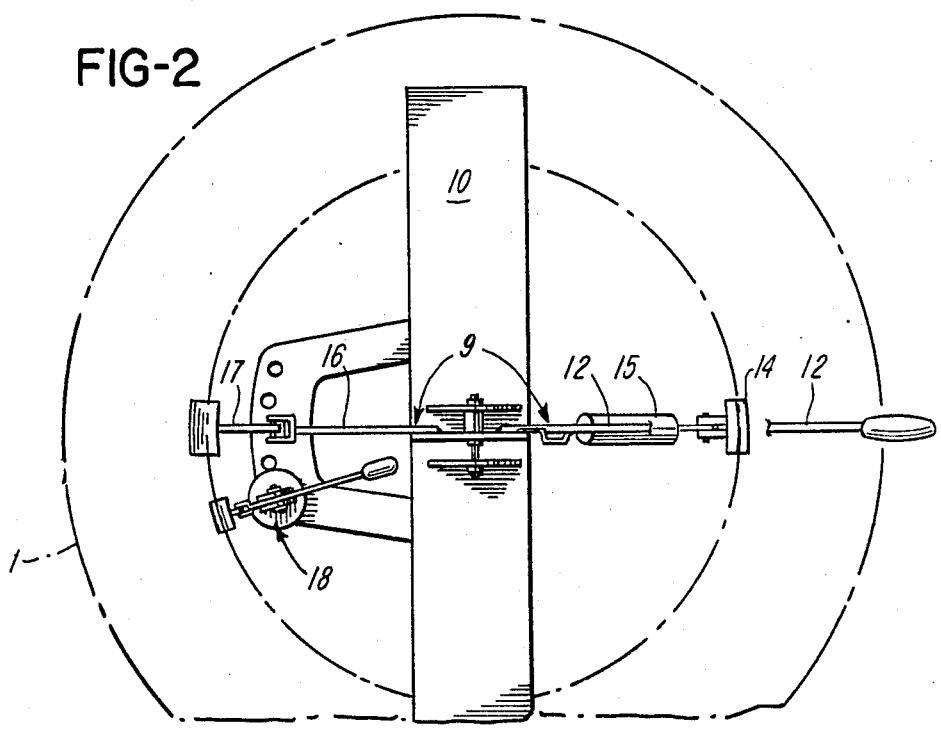
FIG. 2 is a plan view of the demounting apparatus of FIG. 1.

In the tire demounting apparatus of FIGS. 1 and 2, a knee lever 9 is secured upon a support structure 10; to start with, this apparatus is placed upon a horizontal vehicle wheel and tire assembly. A centering element 11 on the support structure 10 can serve for an exact positioning; means can also be provided for fixing the apparatus. Located on the operating lever 12 of the knee lever 9 is a downwardly directed connecting or push rod 13, the other end of which carries a demounting spoon 14. An equalizing spring 15, which is inserted between the demounting spoon 14 and a flange of the support structure 10, and which predominantly acts as a compression spring, assures that the demounting spoon 14 is pressed with a sufficient force against the tire bead 2.

A demounting hook 17 can be linked to the load arm 16 of the knee lever 9. A small, supplemental knee lever 18 can be secured to the support structure 10 in the vicinity of the hook 17. The distance between the demounting hook 17 and the supplemental knee lever 18 should be such that the two of them form an angle of about 15° with the axis of the wheel.

The links of the operating lever 12, load arm 16, connecting rod 13, equalizing spring 15 (with rod), and demounting hook 17, as well as the points of securement of the connecting rod 13, of the equalizing spring 15, and the demounting hook 17 are coordinated with one another in such a way that the following operating sequence occurs when the operating lever 12 is pushed down. At the beginning, with the aid of the connecting rod 13 and the equalizing spring 15, the demounting spoon 14 is pressed against the tire bead 2, or the lower side wall region of the tire in the vicinity of the rim flange 6. During the downward movement of the operating lever 12, a portion of the tire bead 2 is gradually forced into the deep mounting bed 7. When this portion of the tire bead 2 has at least partially entered the deep mounting bed 7, the demounting hook 17 engages the oppositely located bead portion, which in the meantime has become dislodged from its seating surface 5. During the course of the further downward movement of the operating lever 12, the demounting hook 17 pulls the second bead section over the rim flange 6 in a manner which is protective of the bead. Finally, if necessary, the supplemental knee lever 18 can be utilized to increase the amount of the peripheral portion of the bead 2 which has been demounted to such an extent that subsequently the entire bead 2 can be easily pulled from the rim 3 by hand or with other auxiliary means.

FIG. 3 schematically illustrates an embodiment in which, in place of the demounting spoon, a driveable roller 19 engages a first bead section and forces the latter into the deep mounting bed 7. Various types of driveable rollers 19 are already known. After the roller 19 has forced the first bead section into the deep bed 7, and the second bead section on the opposite side has been dislodged from the rim 3, a demounting hook 17 can engage this bead section. The demounting hook 17 may be hydraulically operated and, just like the driveable roller 19, may be integrated in a mounting or demounting apparatus.

In summary, the significant aspect of the inventive method is that first one tire bead portion is forced into the deep mounting bed 7, and only subsequently is the oppositely located bead portion lifted over the rim flange 6.

The present invention is, of course, in no way restricted to the specific disclosure of the specification and drawings, but also encompasses any modifications within the scope of the appended claims.

What we claim is:

1. A method of demounting a pneumatic vehicle tire, the beads of which, in the mounted state, are disposed on the radially inner periphery of a wheel rim having a deep mounting bed and, laterally outwardly therefrom, rim flanges which extend essentially radially inwardly; said method includes the steps of:
   first forcing a portion of one of said tire beads into said deep mounting bed; and
   subsequently lifting the oppositely located portion of the same tire bead over the associated rim flange.

2. A method according to claim 1, which includes the step of effecting said forcing and lifting steps with a single movement sequence.

3. A method according to claim 2, which includes the steps of providing a lever, and manually pressing down said lever as said movement sequence.

4. An apparatus for demounting a pneumatic vehicle tire, the beads of which, in the mounted state, are disposed on the radially inner periphery of a wheel rim having a deep mounting bed and, laterally outwardly therefrom, rim flanges which extend essentially radially inwardly; said apparatus comprises:
   first means for forcing a portion of one of said tire beads into said deep mounting bed; and
   second means for lifting the oppositely located portion of the same tire bead over the associated rim flange.

5. An apparatus according to claim 4, which includes a support structure, and a knee lever which is mounted on said support structure and can be pushed down; said knee lever includes a first arm in the form of an operating lever to which is connected a connecting rod, and a second arm; said first means, for forcing a portion of one of said tire beads into said deep mounting bed, is in the form of a demounting spoon which is connected to said connecting rod; and said second means, for lifting the oppositely located portion of the same tire bead over the associated rim flange, is in the form of a demounting hook.

6. An apparatus according to claim 5, which includes a compression spring which acts upon said demounting spoon to push it predominantly radially outwardly.

7. An apparatus according to claim 5, which includes a smaller supplemental knee lever which is mounted on said support structure in the vicinity of said demounting hook.

8. An apparatus according to claim 5, which includes centering means disposed on said support structure.

9. An apparatus according to claim 5, which includes fixing means disposed on said support structure.

10. An apparatus according to claim 4, in which said first means, for forcing a portion of one of said tire beads into said deep mounting bed, is in the form of a driveable roller.

* * * * *